US006839947B1

(12) United States Patent
Dudeck

(10) Patent No.: US 6,839,947 B1
(45) Date of Patent: Jan. 11, 2005

(54) POWER HAMMER PULLER

(76) Inventor: Martin J. Dudeck, 1370 Haven Dr., Oviedo, FL (US) 32765

( * ) Notice: Subject to any disclaimer, the term of this patent is extended or adjusted under 35 U.S.C. 154(b) by 103 days.

(21) Appl. No.: 10/285,260

(22) Filed: Oct. 31, 2002

(51) Int. Cl.[7] .................................................. B23P 19/04

(52) U.S. Cl. .............................. 29/255; 29/267; 29/280

(58) Field of Search .......................... 29/255, 267, 263, 29/280, 282, 281.5, 275

(56) References Cited

U.S. PATENT DOCUMENTS 4,625,812 A 12/1986 Pool
5,103,544 A 4/1992 Patterson
5,417,294 A 5/1995 Suher
5,579,567 A 12/1996 Acevedo
5,730,021 A 3/1998 Johnson
6,247,217 B1 * 6/2001 Kilgore ........................ 29/255

* cited by examiner

*Primary Examiner*—Lee D. Wilson
(74) *Attorney, Agent, or Firm*—Lawrence J. Gibney, Jr.

(57) ABSTRACT

The embodiment of this invention is disclosed which describes a power hammer puller to remove items from a shaft. The device consists of a cylindrical tube into which an air hammer fits. A bit is installed on one end of the tube and the other end is threaded to allow items to be removed from shafts. While the embodiments of the invention have been disclosed, certain modifications may be made by those skilled in the art to modify the various size of the tube as well as the size of the bit or the size of the standard threaded hole to accommodate particular applications.

2 Claims, 4 Drawing Sheets

POWER HAMMER PULLER

STATEMENT REGARDING FEDERALLY SPONSORED RESEARCH

No federal research money was used in the development of this invention.

CROSS REFERENCES TO RELATED APPLICATIONS

None

Reference to Appendix

No appendix accompanies this application

BACKGROUND OF THE INVENTION

This invention relates to a device, which would help individuals, such as mechanics, to remove items such as bearings from shafts. Any individual could use the device and the user need not be a mechanic to use this device. The device is also not limited to the removal of bearings but this is a potential use. This device utilizes an air hammer, and for an example a claw mechanism to remove the bearing from the shaft.

The claw mechanism and the air hammer are not necessary parts of the invention but illustrate how the device is to be used. However, an air hammer is necessary to operate this device.

The specific item that is being claimed is a tube, which contains a bit on one end and a flat surface, which is threaded, on the opposite end. The tube is cylindrical but is hollowed along one side of the tube. It is hollowed to accommodate an air hammer. The air hammer is inserted into the hollow space and is attached to the bit, which is welded or flanged to one end of the tube. An air hammer is a standard piece of equipment, which is available on the market and is needed to operate this device. This device will accommodate all air hammers.

When the air hammer is installed over the bit and becomes operational, it strikes the bit in a very rapid fashion. This striking action pushes the bit and tube in one direction. On the opposite end of the tube a device such as a claw is attached to the end of the tube. The opposite end of the tube from the bit is threaded to secure devices, which allow the user to remove items from shafts.

This invention will reduce the risk of injury to the person operating the device and also reduce damage to the equipment. Without this invention the individual who is removing an item, such as a bearing, must manually use a hammer to force the bearing off the shaft. This of course can lead to personal injury as well as scoring of the shaft upon which the bearing sits.

This invention would also save money in terms of reducing the risk of injury to the individual as well as reducing the risk of any injury to the equipment.

This invention has many different applications. It may be used in the automotive industry, marine industry as well as many other industrial applications. This invention may also be used to take off pump impellers, bearings or any items that are on a shaft.

BRIEF SUMMARY OF THE INVENTION

The power hammer puller utilizes an air hammer to quickly, easily and efficiently remove a bearing from a shaft. With the use of this device there is very little, if any, risk of injury to the individual as well as very little, if any, risk of injury to the piece of mechanical equipment.

The specific invention consists of a cylindrical tube, which is equipped with a bit on one end and is threaded on the opposite end. The tube is hollowed on one side, in order to accommodate an air hammer. The air hammer is placed inside the tube and secured around the bit. At one end of the tube is the bit around which the air hammer is attached. On the opposite end, from the end with the bit, is a standard size bolt, which is screwed into the threaded portion of the device.

As an example, a claw is placed around the bolt, which is inserted through the threaded end. The claw device grabs the bearing or pump impeller and the screw is used to attach the claw device to the hollow tube.

The air hammer is inserted around the bit at the opposite end of the claw for example. The air hammer is then activated so that the rapid hammering mechanism of the air hammer enables the claw to pull the bearing off the shaft.

As an example, the claw device, which is not part of the claimed invention, consists of a series of arms, which assist in the removal of the bearing or impeller. As the hammer operates it forces the bearing off the shaft.

The specific invention involved is the hollow tube with the bit device. The bit may be flanged or welded to the interior surface of the tube.

BRIEF DESCRIPTION OF THE DRAWINGS

The invention is further described in connection with the accompanying drawings.

DETAILED DESCRIPTION

The device is a cylindrical tube with a bit on the end plate and a mechanism to allow a claw to be inserted on the opposite end. A pneumatic hammer is inserted in the hollowed part of the tube and over the bit, which is at the opposite end of the claw. As the pneumatic hammer is operated the claw pulls a bearing, for instance, off a shaft.

Figure 1:
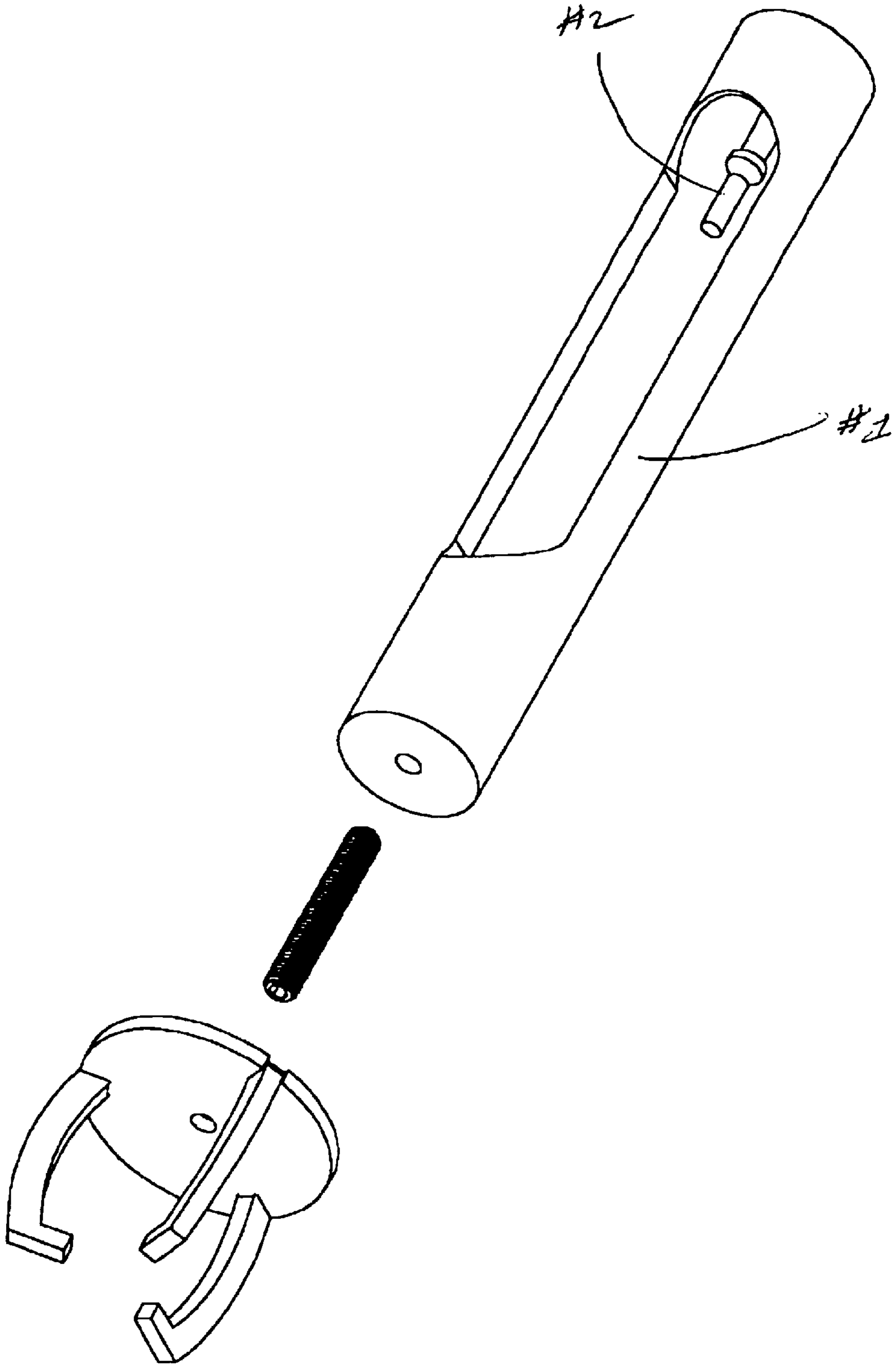
FIG. 1 is a perspective view of the power hammer puller.
Figure 2:
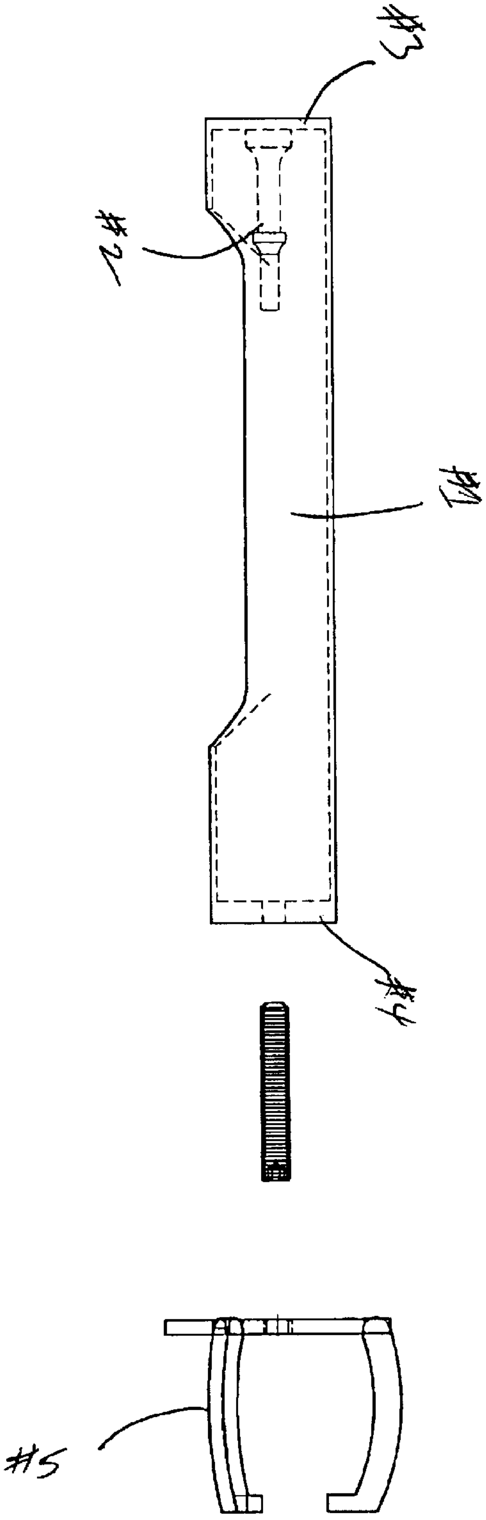
FIG. 2 is a side view of the invention showing the tube, the bit, as well as the claw and the bolt.
Figure 3:
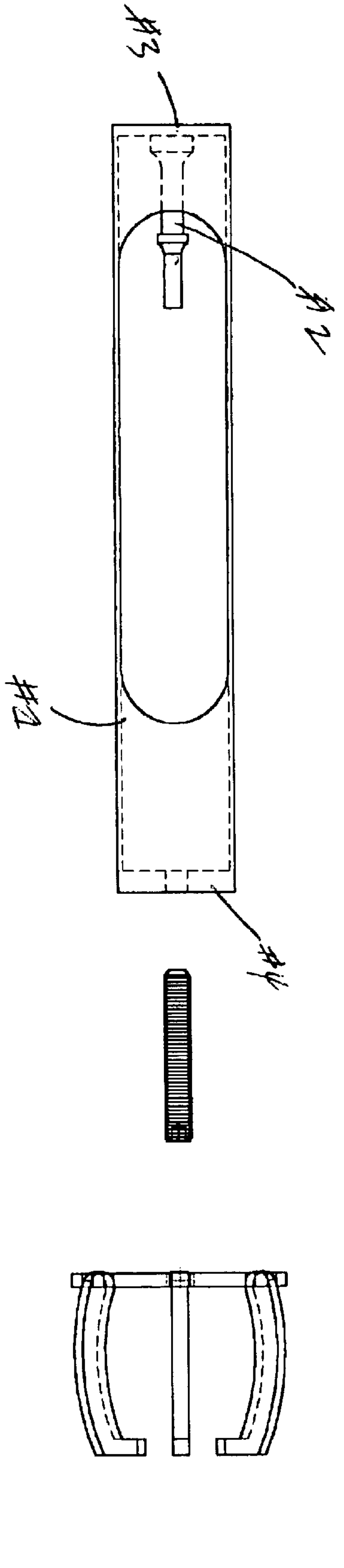
FIG. 3 is a bottom view of the tube.
Figure 4:
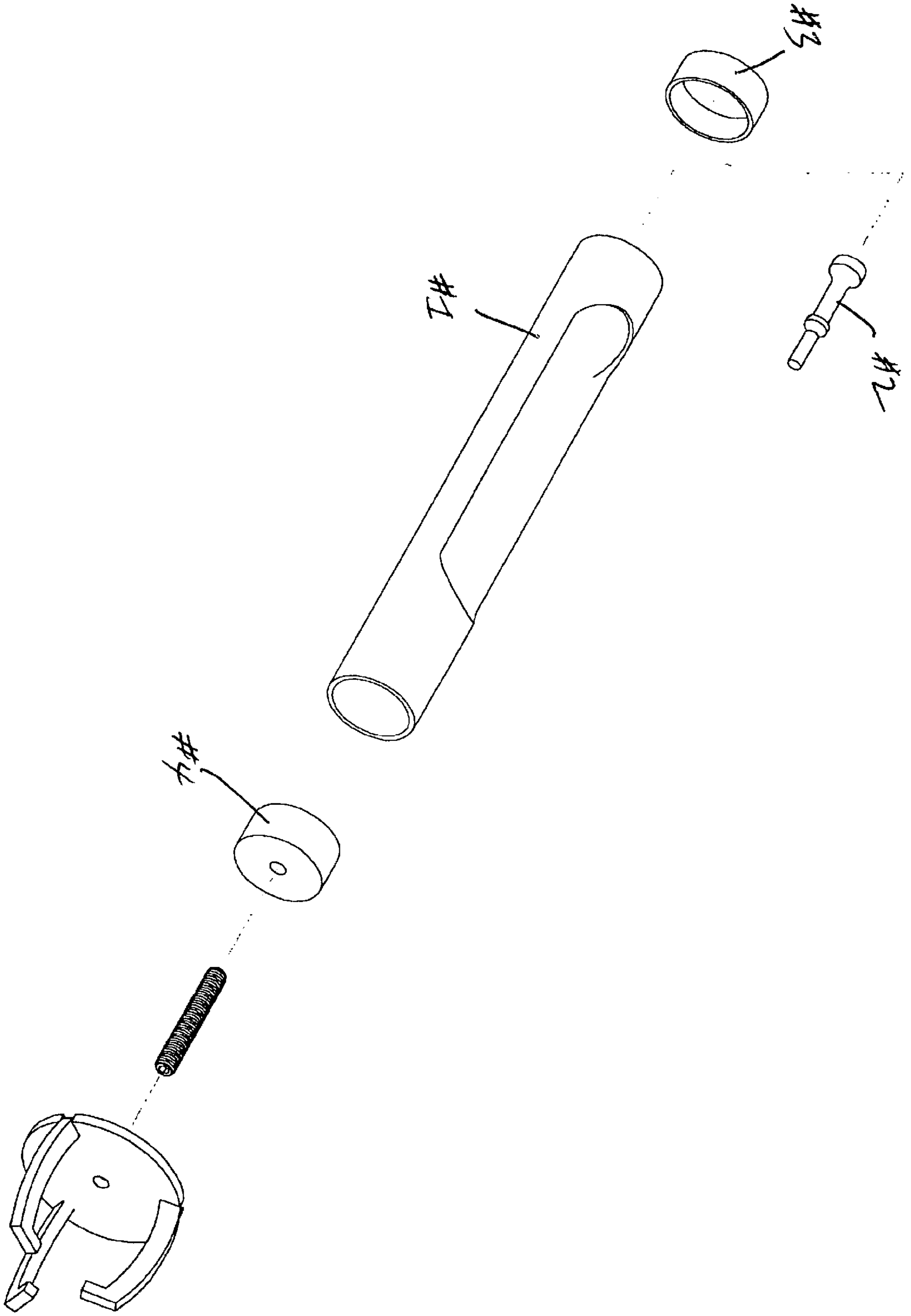
FIG. 4 is an exploded view of the tube with the bit.

According to FIG. 1, the device itself is the tube (#1). Integral to the device is the end plate which contains the bit (#2) FIG. 1. There are tow end plates (#3 and 4) (FIGS. 2, 3, and 4). One of the end plates (#3) houses the bit (#2), which is used in this device. A standard air hammer is placed over the bit. The bit (#2) which is part of the device is flanged or welded to the end plate. (#3).

Another end plate (#4) is used in this device. The purpose of this end plate, which is tapped and threaded, is to pull the bearing off the shaft, FIG. 2 depicts a representation of a typical "claw" (#5), which pulls bearings from shafts. The claw itself is not being claimed as part of this invention.

As the air hammer is placed over the bit (#2) and operated the force will pull the bearing from the shaft.

What is claimed is:

1. A power hammer puller, which is comprised of the following:

a. end plates;

b. a bit;

wherein the end plates are part of a cylinder and the end plates are positioned on the opposite ends of the cylinder;

wherein one end plate is solid and one end plate is tapped and threaded;

wherein the bit is attached to the interior surface of the solid end plate, thereby placing the bit inside the cylinder.

2. The power hammer puller as described in claim 1, wherein the cylinder an opening which is provided to insert an air hammer over the bit.

* * * * *